United States Patent [19]

Pingelton et al.

[11] Patent Number: 5,322,171
[45] Date of Patent: Jun. 21, 1994

[54] DISPENSER APPARATUS

[75] Inventors: John Pingelton; Gary Richardson; Jerry Hull, all of Tulsa, Okla.

[73] Assignee: Jero Manufacturing, Inc., Tulsa, Okla.

[21] Appl. No.: 139,841

[22] Filed: Oct. 22, 1993

[51] Int. Cl.⁵ ............................................. A47F 5/00
[52] U.S. Cl. ........................ 211/59.3; 108/136; 211/207; 312/71
[58] Field of Search ............ 211/59.3, 207, 49.1; 108/136; 312/71

[56] References Cited

U.S. PATENT DOCUMENTS

| | | |
|---|---|---|
| 2,448,171 | 8/1948 | Campbell . |
| 2,468,115 | 4/1949 | Saul, Jr. . |
| 2,717,085 | 9/1955 | Waddington . |
| 2,816,808 | 12/1957 | Haines . |
| 3,163,292 | 12/1964 | Shelley ........................ 211/59.3 |
| 3,407,015 | 10/1968 | Silberberg . |
| 3,511,548 | 5/1970 | McIlhone . |
| 3,694,044 | 9/1972 | Cummings . |
| 3,738,722 | 6/1973 | Koolman . |
| 4,206,954 | 6/1980 | Koolman . |
| 4,354,605 | 10/1982 | Brutsman . |
| 4,449,760 | 5/1984 | House . |
| 4,828,119 | 5/1989 | Pingelton . |
| 5,119,946 | 6/1992 | Baker . |
| 5,181,620 | 1/1993 | Watt ................................ 211/59.3 |
| 5,199,600 | 4/1993 | Fietsam .......................... 211/59.3 |

Primary Examiner—Robert W. Gibson, Jr.
Attorney, Agent, or Firm—Head & Johnson

[57] ABSTRACT

A dispenser apparatus for trays, plates or the like. The dispenser apparatus includes a top member having an opening therethrough for the trays, plates or the like and includes a base. A plurality of post assemblies are provided with each post assembly extending between the top member and the base. The length of each post assembly may be varied between a fully extended and a retracted position.

20 Claims, 6 Drawing Sheets

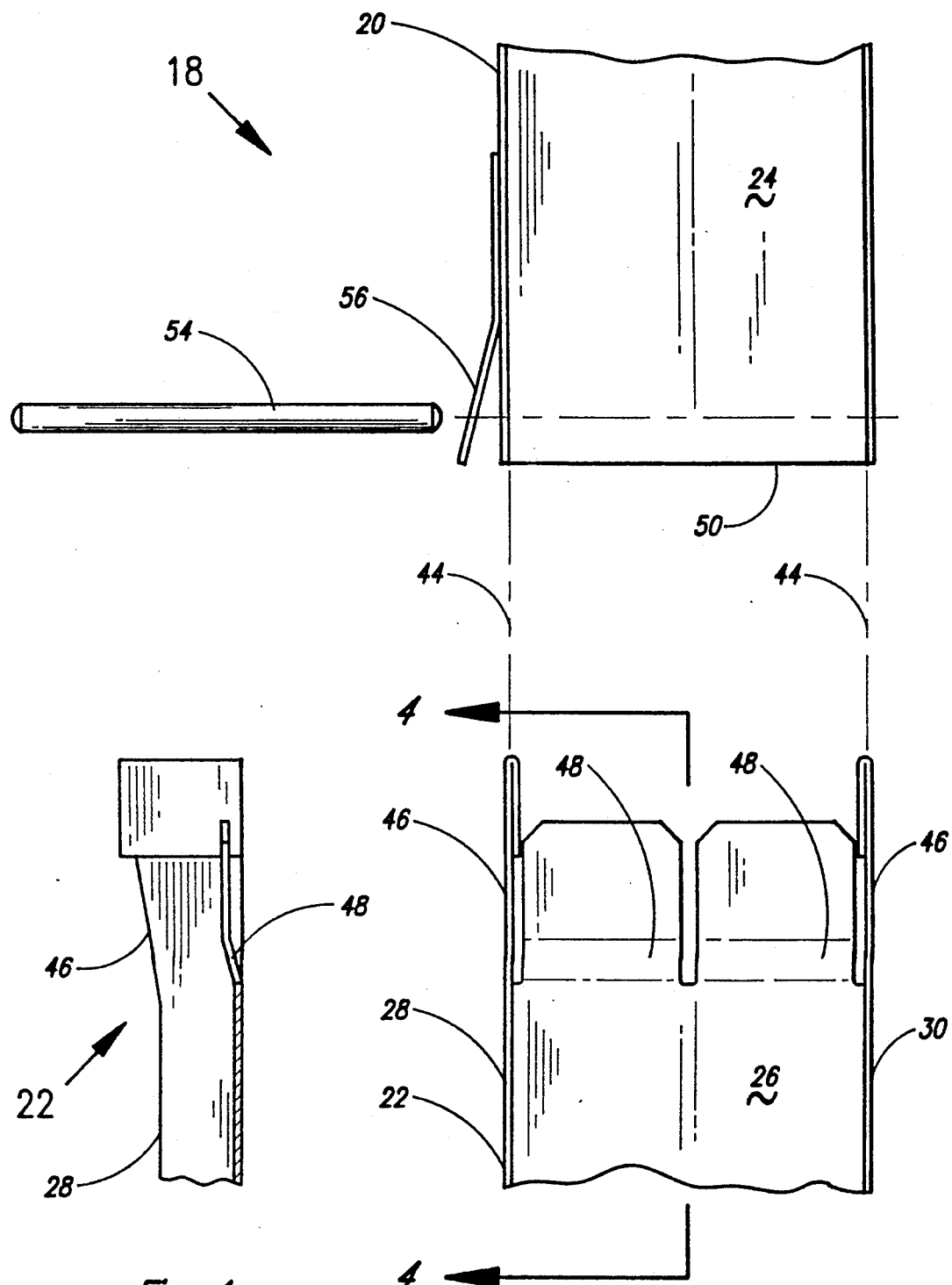

DISPENSER APPARATUS

BACKGROUND OF THE INVENTION

1. Field of the Invention

The present invention is directed to a self-leveling dispenser apparatus which is capable of storing and dispensing multiple items such as trays, plates or the like. In particular, the present invention in directed to a dispenser apparatus that may be varied in length between a fully extended and a fully retracted position.

2. Prior Art

Self-leveling dispensers for trays, plates or the like are widely used in restaurants, cafeterias and various food service establishments. The plates or other items are stacked and then retained in the dispenser for use. Various spring mechanisms have been used to lift the top level of the plates to dispense the items. As plates, for instance, are removed, the remaining plates move upward to the same level as the removed plates. Accordingly, the top of the stack remains at a somewhat constant level at all times. The amount of upward force may be varied depending on the weight of the items to be dispensed. The dispensers will have a length or height at least as tall as the stack of items to be held. The dispenser frame may include a series of posts which extend over the length of the dispenser.

Often times, the dispensers will be retained within and supported from a cabinet or other table. The units are typically self-supporting from a top or upper annular member. This top or annular member will rest upon the table or cabinet. In the field, the height of the dispenser can be no greater than the table or cabinet to be installed in.

Accordingly, it would be advantageous to be able to vary the height of the dispenser.

Additionally, the plate dispensers are often installed in a cabinet or table which is beneath an overhead obstruction such as a protruding shelf or a "sneeze guard" used at salad bars and other food service facilities. When installing the plate dispenser, the entire length of the plate dispenser must navigate these overhead obstructions. Accordingly, it is advantageous to reduce the overall length of the plate dispenser during installation but increase the length of the plate dispenser for maximum storage of plates.

Additionally, it would be advantageous to reduce the length of the plate dispenser during transportation and storage, yet increase the length of the dispenser during use for maximum storage of plates.

Accordingly, it is the principal object and purpose of the present invention to provide a plate dispenser having a variable length.

It is a further object and purpose of the present invention to provide a dispenser apparatus having post assemblies that will lock in a fully extended position for use.

It is an additional object and purpose of the present invention to provide a dispenser having post assemblies that will extend and retract in response to downward or upward movement of the stacked items.

SUMMARY OF THE INVENTION

The present invention provides a dispenser apparatus to store and dispense a plurality of stackable items such as trays, bowls, plates or the like. The dispenser apparatus includes a top or upper annular member having a circular opening therethrough. The dispenser apparatus also includes a base having a smaller diameter than the top member.

A plurality of post assemblies extend between the top member and the base. Each post assembly includes an upper channel and a lower channel, the channels slidably engaged with each other. Each channel has a face and a pair of opposed flanges extend outward from each face.

The dispenser apparatus includes a platform assembly for supporting the items. The platform assembly is suspended from the top member by a plurality of extension springs. The upward force of the springs lifts the items to the top upper annular member.

The post assemblies surround the platform assembly and limit the lateral movement of the platform assembly.

In one embodiment of the invention, a mechanism is provided to vary the length of each post assembly between a fully extended position and a retracted position. When the post assemblies are in the fully extended position, a mechanism is provided to lock the post assemblies in place.

The retracted position will be used during transportation of the device, during installation of the apparatus, and during removal of the apparatus for cleaning or adjustment.

When the post assemblies are in the fully extended position, the upper face and the lower face of each channel are parallel and flush with each other.

The opposed flanges extending from each lower face have an extending cam ramp. Each lower face also includes a recess at the upper end thereof. The recess has a depth which approximates the width of the upper face so that when the apparatus is in the fully extended position, the lower edge of the upper channel resides therein.

A transverse pin extends through an aperture in each flange of the upper channel. As the post assembly is moved into the fully extended position, the transverse pin will ride along the cam ramps, forcing the upper face into the recess. The upper channel will tend to lock into position with the upper face residing within the recess of the lower face.

The pin may be retained in place within the apertures of the flanges by a retainer clip extending from one of the flanges.

In an alternate embodiment of the invention, the post assemblies will extend or retract in response to downward or upward movement of the platform assembly. The post assemblies will extend by force of gravity and will retract in response to upward movement of the platform assembly.

BRIEF DESCRIPTION OF THE DRAWINGS

FIG. 3 is an enlarged exploded view of a portion of one of the post assemblies shown in the dispenser apparatus in FIG. 1;

FIG. 4 is a sectional view taken along section line 4—4 of FIG. 3;

DETAILED DESCRIPTION OF THE PREFERRED EMBODIMENTS

Figure 1:
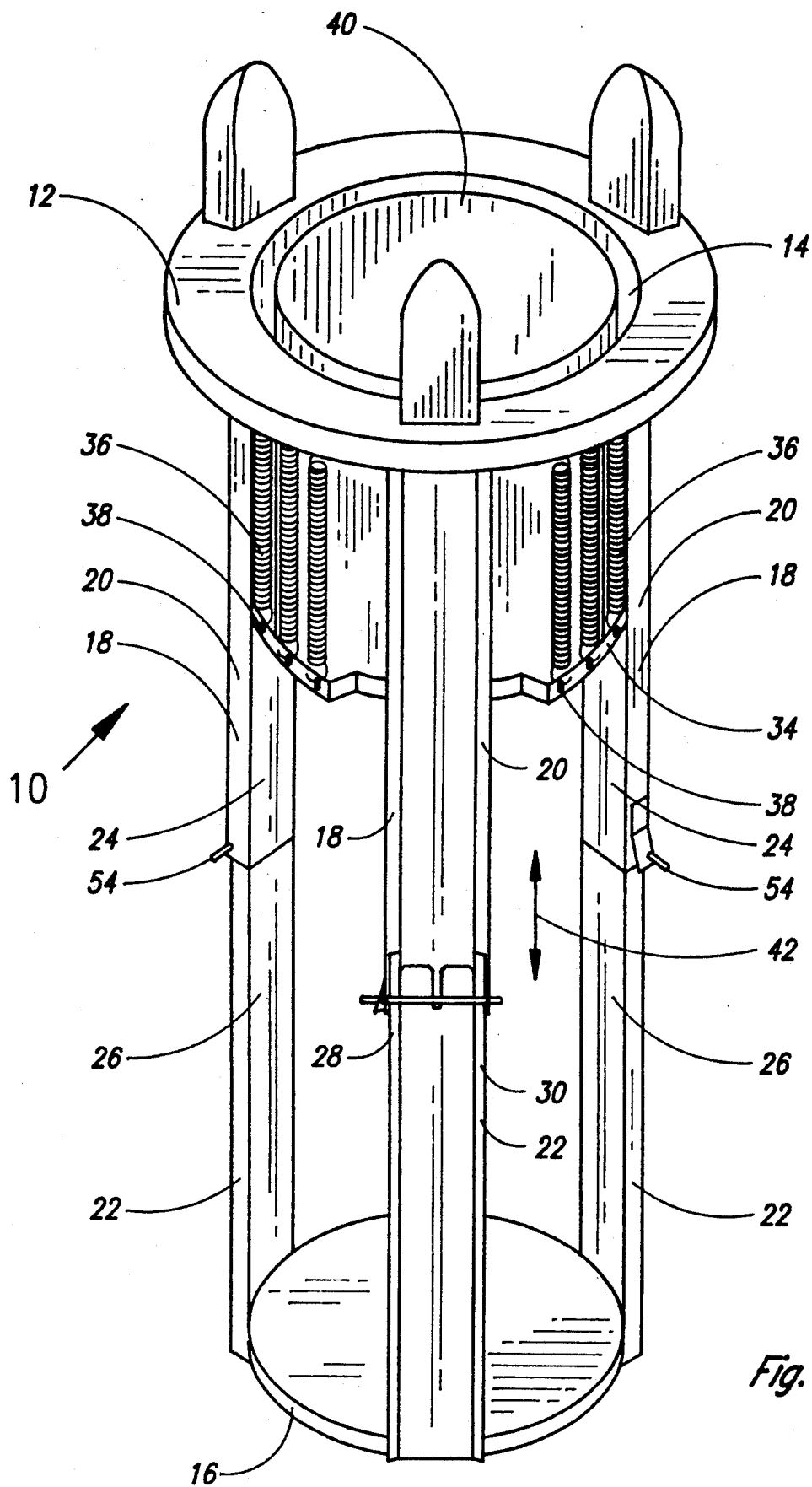
FIG. 1 is a perspective view of a dispenser apparatus constructed in accordance with the present invention showing the post assemblies in the fully extended position.

Referring to the drawings in detail, FIG. 1 illustrates a perspective view of a dispenser apparatus 10 constructed in accordance with the present invention. The dispenser apparatus would be used to store and dispense a plurality of stackable items such as trays, bowls, plates or the like (not shown).

The apparatus includes a top or upper annular member 12 having a circular opening 14 therethrough. The trays, plates or other items are inserted into and through the circular opening 14 and stored therein. As the items are dispensed, the total weight of the items decreases. The self-leveling mechanism will lift the items up to and through the circular opening 14.

The dispenser apparatus 10 also includes a base 16 which, in the present embodiment, is constructed of a metal circular plate. The diameter of the top member 12 is larger than the diameter of the base. Accordingly, the apparatus may be installed in an opening in a cabinet or table less than the diameter of the top member so that the apparatus is supported from the top member 12.

Three plate guides 17 extend upward from the top member to restrain lateral movement of plates above the level of the top member.

A plurality of post assemblies 18 extend between the top member 12 and the base 16.

Each post assembly includes an upper channel 20 and a lower channel 22, the upper channel extending from the top member 12 and the lower channel extending from the base 16. The channels 20 and 22 are slidably engaged with each other; The upper channel is located closest to the circular opening and cylindrical cavity with the lower channel external thereto. Each channel 20 and 22 has a face 24 and 26, respectively. A pair of opposed flanges 28 and 30 extend outward from each upper face and each lower face. The faces 28 and 30 extend outward away from the circular opening 14 and the axis of the cylindrical cavity of the dispenser apparatus.

It is has been found that a minimum of three (3) post assemblies 18 provide adequate support for the dispenser apparatus. Each post assembly is parallel to the axis of the cylindrical cavity and parallel to the other post assemblies.

The dispenser apparatus 10 includes a platform assembly 34 for supporting the plates or other items. The platform assembly 34 is suspended from the top member 12 by a plurality of extension springs 36. The extension springs connect with the top member 12 and platform assembly 34 through openings (not visible) in the top member 12 and openings 38 in the platform assembly. The platform assembly 34 also includes a cylindrical spacer 40 so that the lower most or last item to be dispensed will be near the top member 12.

The height of the cylindrical space is approximately equal to the unextended length of the springs.

The amount of upward force of the platform assembly 34 may be varied depending on the weight of particular items to be dispensed. Varying the upward force may be easily accomplished by either adding or subtracting the extension springs 36.

As will be readily observed in FIG. 1, the post assemblies 18 surround the platform assembly 34 and limit the lateral movement of the platform assembly.

The platform assembly 34 will travel in a vertical path as illustrated by arrow 42. The platform assembly 34 may have nylon bearings or knobs extending therefrom(not visible) that ride or glide on the post assemblies during travel. This minimizes metal to metal contact of the platform assembly against the post assemblies.

In the present embodiment, three post assemblies 18 are utilized, although it will be understood that additional post assemblies might be employed. The post assemblies are radially spaced about the top member and the cylindrical cavity.

Figure 2:
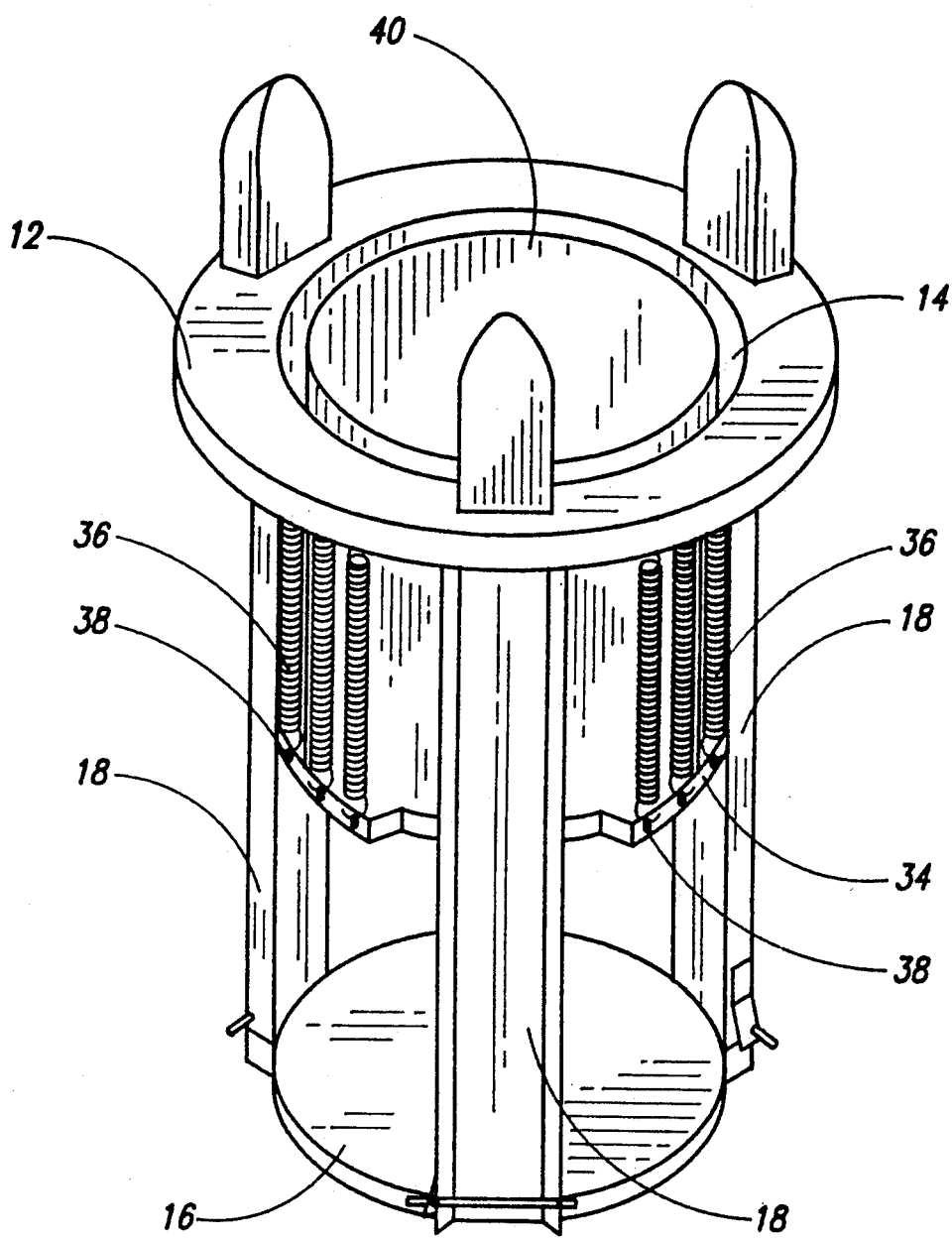
FIG. 2 is a dispenser apparatus as shown in FIG. 1 in the retracted position.

A mechanism is provided to vary the length of each post assembly between a fully extended position and a retracted position. The fully extended position of the post assemblies is shown in FIG. 1, while the retracted position is illustrated in FIG. 2. When the post assemblies are in the fully extended position as shown in FIG. 1, a mechanism is provided to lock the post assemblies in the fully extended position.

The retracted position shown in FIG. 2 will be used during transportation or storage of the apparatus, during installation of the apparatus, and during removal of the apparatus for cleaning or adjustment.

Since each upper channel 20 and lower channel 22 engage and slide with relation to each other, the apparatus may be moved to the extended position by moving the top member 12 with respect to the base or by holding the top member and allowing the force of gravity to pull the base 12 downward. When the post assemblies are in the fully extended position as shown in FIG. 1, the upper face 24 and the lower face 26 are parallel and flush with each other. Accordingly, the platform assembly 34 may ride up and down as indicated by arrow 42 without interference.

FIGS. 3 and 4 illustrate the mechanism to lock the post assemblies in the fully extended position. FIG. 3 shows an enlarged, exploded view of the lower portion of the upper channel 20 and the upper portion of the lower channel 22. Dashed lines 44 illustrate how the lower channel 22 rides within the upper channel.

The opposed flanges 28 and 30 extending from lower face 26 each have an extending cam ramp 46 as best seen in sectional view in FIG. 4 taken along section line 4—4 in FIG. 3. Lower face 26 also includes a recess at 48 at the upper end thereof. The recess 48 has a depth which approximates the width of the upper face 24 so that when the post assemblies are in the fully extended position, the lower edge 50 of the upper channel 20 resides therein. When the lower edge 50 resides within the recess 48, the upper channel and lower channel are flush with each other.

A transverse pin 54 extends through an aperture in each flange of the upper channel 20. As the post assembly 18 is moved into the fully extended position, the transverse pin 54 will ride along the cam ramps 46 urging and forcing the upper face 24 into the recess 48. Additionally, the upper channel 20 will tend to lock into position with the upper face 24 residing within the upper recess 48.

The pin 54 may be retained in place within the apertures of the faces by a retainer clip 56 extending from one of the flanges 28. The retainer clip 56 includes an aperture through a flat spring.

Figures 5, 6:
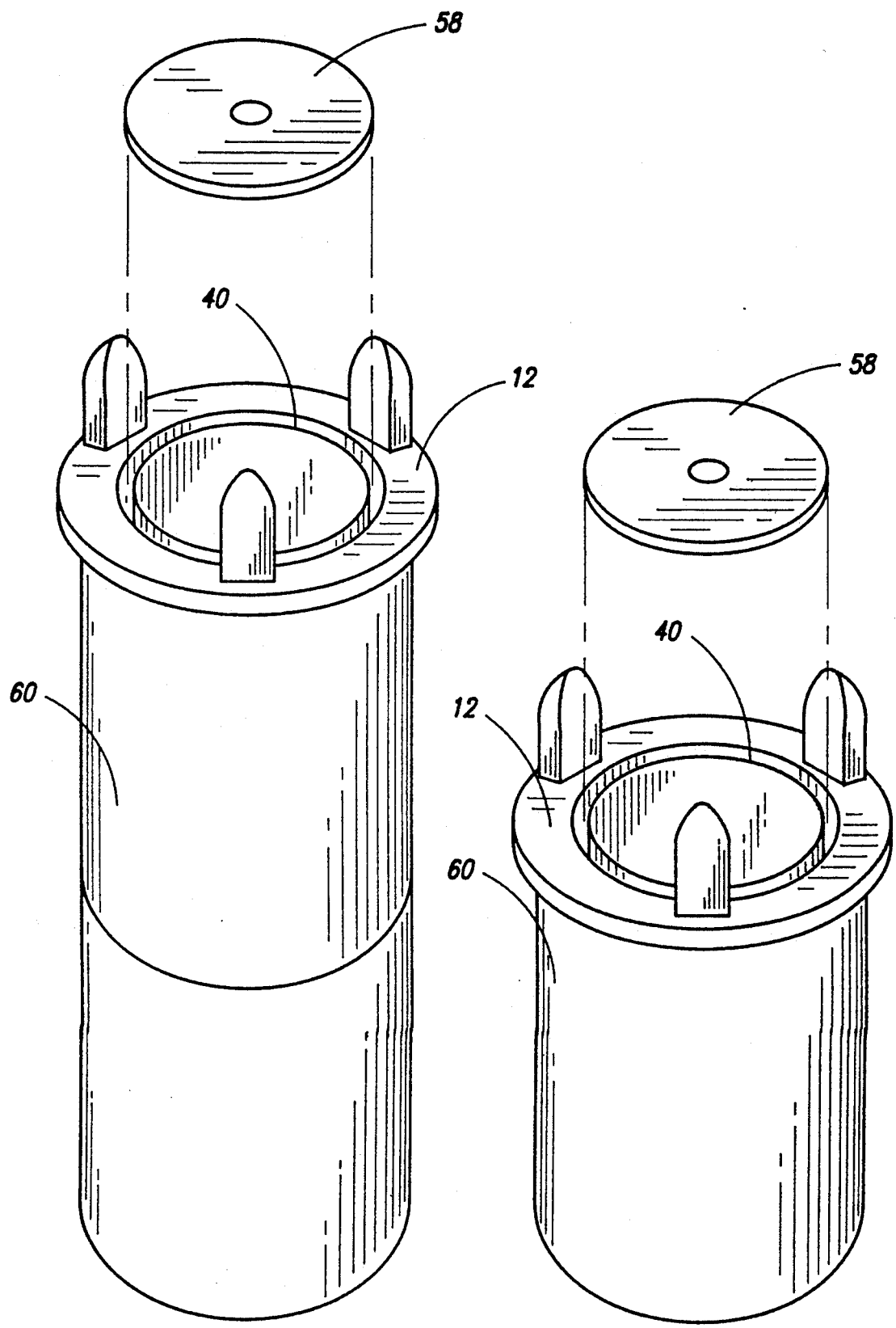
FIG. 5 is an alternate embodiment of the dispenser apparatus having an external cylindrical shield and shown in the fully extended position.
FIG. 6 is a dispenser apparatus as shown in FIG. 5 in the retracted position.

FIGS. 5 and 6 illustrate an alternate configuration of the dispenser apparatus 10 showing a carrier plate 58 which would reside on top of the cylindrical spacer 40. The plates or other items would rest on top of and be supported by the carrier plate 58.

FIGS. 5 and 6 also illustrate an optional external telescoping cylindrical shield 60. The cylindrical shield and apparatus are shown in the fully extended position in FIG. 5. The retracted position is shown in FIG. 6.

The shield is often employed in embodiments of the apparatus which include electric or other heaters to heat the plates or other items if desired prior to being dispensed.

To install the dispenser apparatus 10, it will be initially placed in the retracted position, as illustrated in FIGS. 2 and 6. The post assemblies 18 and the base 16 will then be threaded into and through an opening in the cabinet or table so that the top member 12 will rest upon the table and support the apparatus 10. This may be accomplished by holding the apparatus by the base. The installer may place an arm through the cylindrical spacer to reach the base 16 which may be provided with a finger hole or a handle (not visible).

Once the apparatus has been inserted, the base 16 will be released, and the force of gravity may pull down the base to extend the post assemblies. Alternately, the base 16 may be pushed away from the top member to extend the post assemblies. If the post assemblies are allowed to move to the fully extended position, as shown in FIGS. 1 and 5, the post assemblies will lock into the fully extended position as previously described. Thereafter, the carrier plate 58 will be placed over the cylindrical spacer 40 of the platform assembly 34.

Finally, the dispenser apparatus may be loaded with plates or other items and the platform assembly 40 will descend due to the weight of these items.

In order to remove the dispenser apparatus 10 for cleaning, maintenance or adjustment of the spring force, the items will initially be removed from the dispenser apparatus. Thereafter, the carrier plate 58 will be removed so that access is provided to the cylindrical spacer 40. Personnel may then reach through the cylindrical spacer 40 to the base 16. Pulling the base upward toward the top member will cause the post assemblies to move into the retracted position. The transverse pin 54 of each post assembly will move off of the cam ramps 46 and the upper channel 20 will slide with relation to the lower channel 22. Once this is accomplished, the entire dispenser apparatus 10 may be moved out of the cabinet or table top with relative ease.

Figure 7:
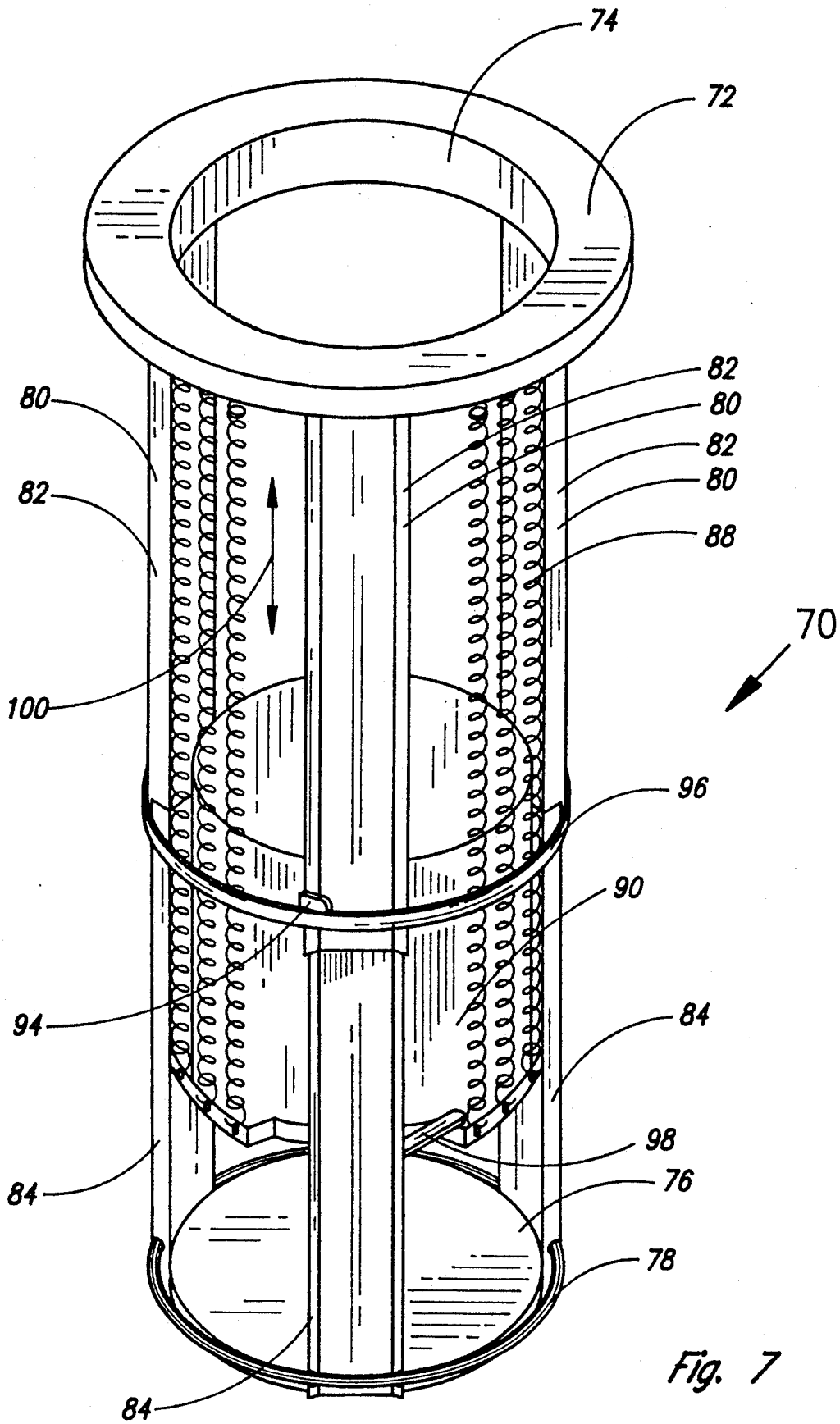
FIG. 7 is a further alternate embodiment of the dispenser apparatus shown in the extended position.
Figure 8:
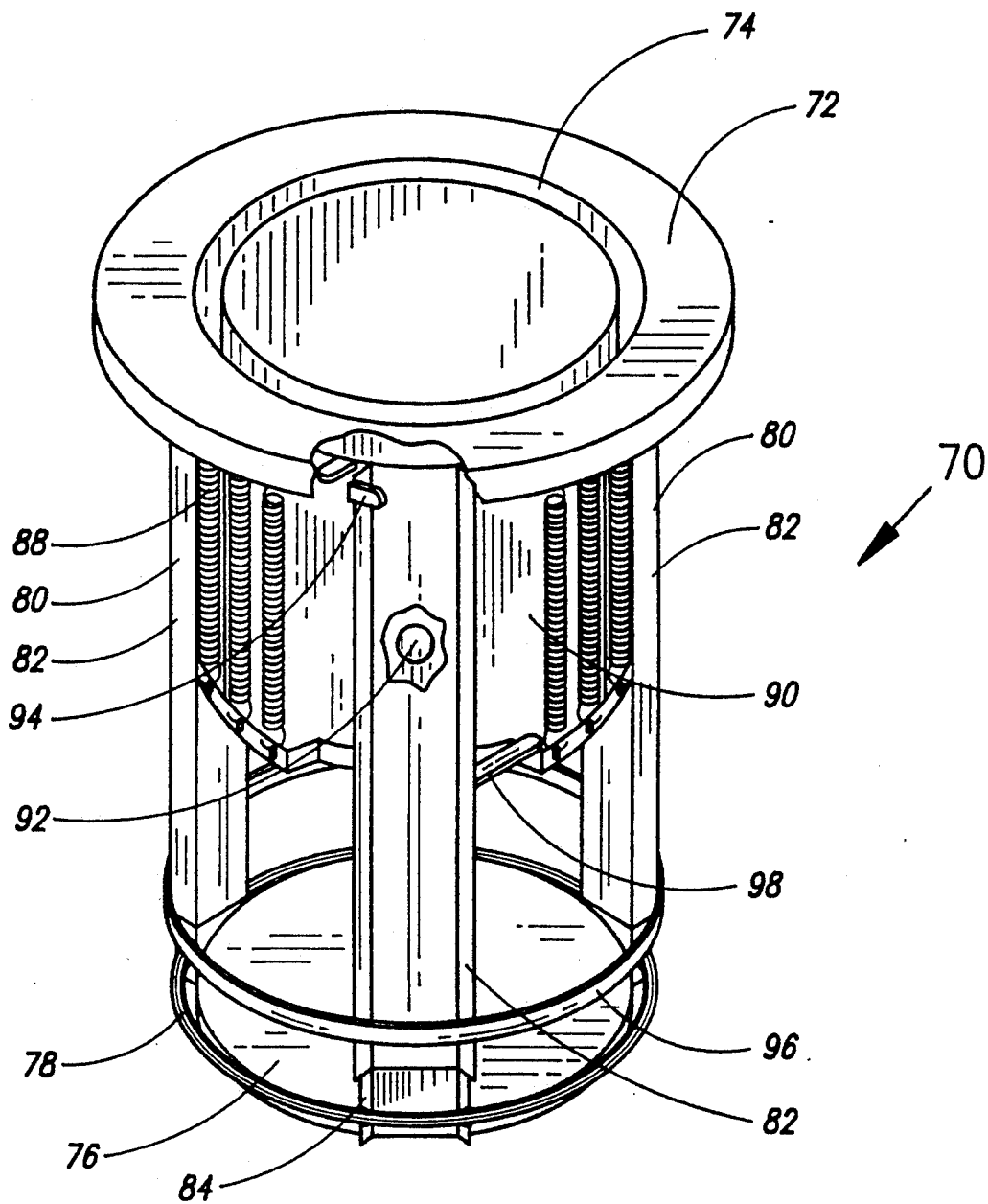
FIG. 8 is a dispenser apparatus as shown in FIG. 7 in the retracted position.

FIGS. 7 and 8 illustrate an alternate embodiment 70 of the dispenser apparatus. FIG. 7 shows the apparatus 70 in the extended position (although the plates are not shown for clarity) while FIG. 8 shows the apparatus in the retracted position.

In the embodiment shown in FIGS. 7 and 8, the post assemblies will be allowed to extend by force of gravity. The post assemblies will retract in response to upward movement of the platform assembly.

The apparatus includes a top or upper annular member 72 having a circular opening 74 therethrough.

The dispenser apparatus 70 also includes a base 76 which may have a thermostatically controlled electric heating element 78. The element 78 would be connected by wire to standard electric service (not shown). The electric heating element is utilized in applications where it is desirable to keep the plates slightly warmed prior to usage.

Three post assemblies 80 extend between the top member 72 and the base 76. Each post assembly 80 includes an upper channel 82 extending from the top and a lower channel 84 extending from the base. The upper channel 82 and lower channel 84 are slidably engaged with each other.

The circular opening 74 in the upper annular member and the post assemblies form a cylindrical cavity. In the embodiment shown in FIGS. 7 and 8, the lower channel is located closest to the cylindrical cavity for reception of the items. The upper channel is located external thereto.

A platform assembly 86, suspended from the top member 72 by a plurality of extension springs 88, supports the plates or other items. The extension springs 88 connect with the top member and the platform assembly. The platform assembly 86 also includes a cylindrical spacer 90 so that the lower most or last item to be dispensed will be slightly above the top member 72. The platform assembly may include a series of nylon bearings or knobs 92 (seen in FIG. 8) that extend from the cylindrical spacer 90 and ride or glide on the post assemblies during travel.

The post assemblies 88 are allowed to move between a fully extended position and a retracted position.

A tab 94 extends from one or more of the lower channels 84 and serves two functions. The tab 94 wraps around the upper channel 82 and guides the upper channel in position with respect to the lower channel to allow them to slidably engage with each other. Additionally, the tab 94 serves as a stop which will abut against a cylindrical band 96 which surrounds and is connected to the upper channels 82. Thus, as seen in FIG. 7, the post assemblies will be allowed to extend up until the tab 94 abuts and rests against the cylindrical band 96. The post assemblies will not be allowed to extend past this position.

An additional tab 98 extends outward from one or more of the lower channels 84. As plates or other items (not shown in FIG. 7) are loaded into the apparatus 70, the cylindrical spacer 90 will descend vertically as shown by arrow 100. The lower channels 84 and attached base 76 will be allowed to descend by force of gravity toward the extended position.

Conversely, when the plates or other items are removed from the apparatus 70, the weight will decrease and the cylindrical spacer 90 will move upward toward the circular opening 74 due to the force of the cylindrical springs 88. As the force of the extension springs 88 causes the cylindrical spacer 90 to move upward, the cylindrical spacer 90 will engage with the tab 98 causing the lower channels 84 and the accompanying base 76 to move upward toward the open circular opening 74. Accordingly, it will be seen that the base and lower channels will extend and retract in response to movement of the platform assembly 86.

In the instance of the heated unit containing the electric heating element 78, the embodiment shown in FIGS. 7 and 8 insures that the heating element will remain close to the plates stored in the apparatus whether the apparatus is full or nearly empty. This occurs because the base with the heating element moves in response to the plates.

Whereas, the present invention has been described in relation to the drawings attached hereto, it should be understood that other and further modifications, apart from those shown or suggested herein, may be made within the spirit and scope of this invention.

What is claimed is:

1. A dispenser apparatus for trays, plates, or the like, which dispenser apparatus comprises:
   a top member having an opening therethrough for said trays, plates or the like;
   a base;
   a plurality of post assemblies, each post assembly extending between said top member and said base;
   means to vary the length of each said post assembly between a fully extended and a retracted position; and
   means to lock each said post assembly in said fully extended position.

2. A dispenser apparatus for trays, plates, or the like as set forth in claim 1 including a platform assembly for supporting said trays, plates, or the like, and at least one spring means extending between said top member and said platform assembly so that said platform assembly is suspended from said top member.

3. A dispenser apparatus for trays, plates, or the like as set forth in claim 2 wherein said spring means includes a plurality of removable extension springs.

4. A dispenser apparatus for trays, plates, or the like as set forth in claim 2 wherein said post assemblies limit lateral movement of said platform assembly.

5. A dispenser apparatus for trays, plates, or the like as set forth in claim 1 wherein said means to vary the length of each said post assembly includes a pair of channels slidably engaged with each other, each channel having a face and a pair of opposed flanges extending from said face.

6. A dispenser apparatus for trays, plates, or the like as set forth in claim 5 wherein said pair of channels comprises a lower channel and an upper channel, said lower channel having a recess in said face at the upper end thereof to receive said upper channel when said post assembly is fully extended.

7. A dispenser apparatus for trays, plates, or the like as set forth in claim 6 wherein said lower channel is equal to the thickness of the upper face.

8. A dispenser apparatus for trays, plates or the like as set forth in claim 1 having three said post assemblies, each said post assembly parallel to each other and spaced radially about said top member opening.

9. A dispenser apparatus as set forth in claim 7 wherein said top member has a diameter larger than the diameter of said post assemblies so that said apparatus may be supported from said top member.

10. A dispenser apparatus for trays, plates, or the like as set forth in claim 1 including an external telescoping cylindrical shield surrounding said post assemblies.

11. A dispenser apparatus for trays, plates or the like as set forth in claim 6 wherein said means to lock each said post assembly in said fully extended position includes an extending cam ramp on each said flange of said lower channel and includes a transverse pin extending through an aperture in each flange of said upper channel so that said pin rides on said cam ramps.

12. A dispenser apparatus for trays, plates or the like as set forth in claim 11 including a retainer clip to hold said transverse pin in said apertures.

13. A dispenser apparatus for trays, plates or the like as set forth in claim 2 wherein said platform assembly includes a cylindrical spacer smaller in diameter than said top member opening and a removable carrier plate.

14. A dispenser apparatus for trays, plates or the like as set forth in claim 1 including a plurality of plate guides upstanding from said top member.

15. A dispenser apparatus for trays, plates, or the like as set forth in claim 2 including a plurality of bearings extending from said platform assembly that ride or glide on said post assemblies during travel of said platform assembly.

16. A dispenser apparatus for trays, plates, or the like, which dispenser apparatus comprises:
   a top member having an opening therethrough for said trays, plates or the like;
   a base;
   a plurality of post assemblies, each post assembly extending between said top member and said base, each post assembly including a lower channel and an upper channel slidably engaged therewith; and
   means to vary the length of each said post assembly between a fully extended and a retracted position.

17. A dispenser apparatus for trays, plates, or the like as set forth in claim 16 including a platform assembly for supporting said trays, plates, or the like, and at least one spring means extending between said top member and said platform assembly so that said platform assembly is suspended from said top member.

18. A dispenser apparatus as set forth in claim 17 wherein said post assemblies will extend from force of gravity and including means to retract said post assemblies in response to movement of said platform assembly toward said top member.

19. A dispenser apparatus for trays, plates, or the like as set forth in claim 18 wherein said means to retract said post assemblies include a tab extending from at least one of said lower channels engaging said platform assembly so that movement of said platform assembly toward said top member will retract said post assembly.

20. A dispenser apparatus for trays, plates, or the like as set forth in claim 17 including means to limit movement of said post assemblies past the fully extended position, said means including a circumferential band surrounding said upper channels and a tab extending from at least one of said lower channels so that said tab will rest against said circumferential band when fully extended.

* * * * *